(12) United States Patent
Thor et al.

(10) Patent No.: US 7,421,326 B2
(45) Date of Patent: Sep. 2, 2008

(54) CLUTCH FAULT DETECTION

(75) Inventors: Todd J. Thor, Byron, MI (US); Brian James Pellerito, Ortonville, MI (US)

(73) Assignee: General Motors Corporation, Detroit, MI (US)

( * ) Notice: Subject to any disclaimer, the term of this patent is extended or adjusted under 35 U.S.C. 154(b) by 760 days.

(21) Appl. No.: 10/918,583

(22) Filed: Aug. 13, 2004

(65) Prior Publication Data

US 2006/0036359 A1 Feb. 16, 2006

(51) Int. Cl.
*G06F 19/00* (2006.01)
*B60W 10/10* (2006.01)

(52) U.S. Cl. ............... 701/67; 701/62; 701/51; 477/34; 192/3.51

(58) Field of Classification Search ........ 701/51, 701/67, 60–64; 192/3.51; 477/34, 37, 39, 477/906
See application file for complete search history.

(56) References Cited

U.S. PATENT DOCUMENTS

| | | | |
|---|---|---|---|
| 5,046,175 A | | 9/1991 | Lentz et al. |
| 5,343,782 A | | 9/1994 | Jamzadeh |
| 5,493,928 A | * | 2/1996 | Mitchell et al. ........... 74/335 |
| 5,577,980 A | | 11/1996 | Vukovich et al. |
| 5,598,334 A | * | 1/1997 | Shin et al. .............. 701/51 |
| 5,609,067 A | * | 3/1997 | Mitchell et al. .......... 74/336 R |
| 6,364,811 B1 | | 4/2002 | Hubbard et al. |
| 6,634,988 B2 | | 10/2003 | Shultz et al. |

FOREIGN PATENT DOCUMENTS

| | | |
|---|---|---|
| DE | 3828128 A1 | 1/1990 |
| DE | 19602006 A1 | 1/1996 |
| DE | 19641074 A1 | 9/1998 |

* cited by examiner

*Primary Examiner*—Yonel Beaulieu

(57) ABSTRACT

A method for detecting a clutch fault of an automatic transmission includes determining a current clutch energy density of a clutch during a range shift and comparing the current clutch energy density to a first energy density threshold. A diagnostic alert is activated if the current clutch energy density exceeds the first energy density threshold.

18 Claims, 3 Drawing Sheets

| Range | Clutches Engaged | | | | |
|---|---|---|---|---|---|
| | C1 | C2 | C3 | C4 | C5 |
| 1 | X | | | | X |
| 2 | X | | | X | |
| 3 | X | | X | | |
| 4 | X | X | | | |
| 5 | | X | X | | |
| 6 | | X | | X | |
| R | | | X | | X |
| N | | | | | X |

| Range | C1 | C2 | C3 | C4 | C5 |
|-------|----|----|----|----|----|
| 1 | X |   |   |   | X |
| 2 | X |   |   | X |   |
| 3 | X |   | X |   |   |
| 4 | X | X |   |   |   |
| 5 |   | X | X |   |   |
| 6 |   | X |   | X |   |
| R |   |   | X |   | X |
| N |   |   |   |   | X |

Clutches Engaged

*Figure 2*

CLUTCH FAULT DETECTION

FIELD OF THE INVENTION

The present invention relates to automatic transmissions, and more particularly to detecting a clutch fault in an automatic transmission.

BACKGROUND OF THE INVENTION

A vehicle powerplant produces drive torque that is transferred through a transmission to a driveline. The automatic transmission includes a number of clutches that are selectively engaged and disengaged to provide one of several speed ratios between input and output shafts. The input shaft is coupled to the vehicle's powerplant through a torque converter. The input shaft drives the output shaft through a gear set. The output shaft is coupled to the driveline to drive wheels of the vehicle.

Shifting from a current speed ratio to another speed ratio involves disengaging an engaged clutch or off-going clutch and engaging another clutch or on-coming clutch. During a shift, a clutch fault may occur. For example, failure of the off-going clutch to fully disengage can cause clutch tie-up. Failure of the on-coming clutch to engage can cause clutch flare. Clutch tie-up results in the on-coming clutch absorbing greater amounts of shift energy and can eventually lead to component failure.

SUMMARY OF THE INVENTION

Accordingly, the present invention provides a method for detecting a clutch fault of an automatic transmission. The method includes determining a current clutch energy density of a clutch during a range shift and comparing the current clutch energy density to a first energy density threshold. A diagnostic alert is activated if the current clutch energy density exceeds the first energy density threshold.

In one feature, the method further includes comparing the current clutch energy density to a second energy density threshold that is greater than the first energy density threshold. Default range shifting is activated if the current clutch energy density exceeds the second energy density threshold.

In other features, determining the current clutch energy density includes determining energy into the clutch and determining energy out of the clutch. A difference between the energy into and the energy out of the clutch is calculated. The difference is divided by an area of the clutch.

In other features, determining the energy into the clutch includes determining torque across the clutch and determining slip across the clutch. Determining the energy out of the clutch includes determining a difference between a clutch temperature and a transmission fluid temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a table illustrating exemplary clutch engagement combinations to achieve various speed ratios of the exemplary automatic transmission.

DETAILED DESCRIPTION OF THE PREFERRED EMBODIMENTS

Figure 1:
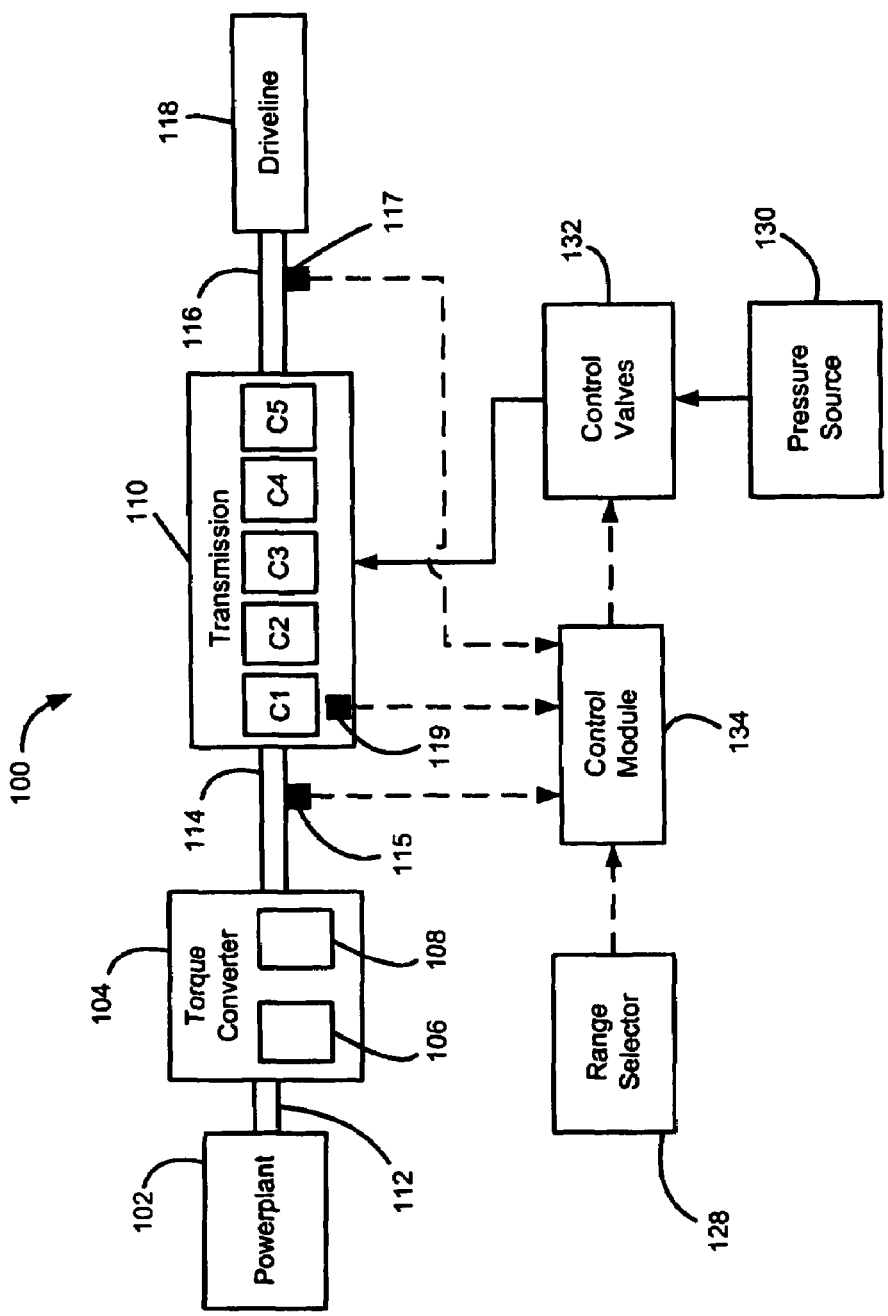
FIG. 1 is a schematic illustration of a vehicle including an exemplary automatic transmission that is controlled by the clutch fault detection system of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, the reference numeral 100 generally designates a motor vehicle including a powerplant 102, a torque converter 104 and an exemplary multiple speed automatic transmission 110. The powerplant 102 produces drive torque and includes, but is not limited to, an internal combustion engine, an electric machine and a combination thereof (e.g., hybrid electric vehicle). The torque converter includes a pump 106 and a turbine 108. The exemplary transmission 110 includes a plurality of hydraulically actuated clutches C1, C2, C3, C4, and C5, that enable, for example, six speed ranges. Speed range shifts are accomplished by selectively engaging and disengaging select clutches. The motor vehicle 100 also includes a driveline 118, a range selector 128, a control module 134, control valves 132 and a hydraulic pressure source 138.

Referring now to FIG. 2, the five clutches C1, C2, C3, C4 and C5 are selectively engaged to provide neutral, six forward drive ratios and one reverse drive ratio. Although the exemplary automatic transmission 110 includes six forward drive ratios and one reverse drive ratio, it is appreciated that the clutch fault detection system of the present invention can be implemented in automatic transmissions having more or fewer drive ratios. The table of FIG. 2 illustrates an exemplary combination of engaged clutches to establish the various drive ratios. The first forward drive ratio is established by engaging the first clutch C1 and the fifth clutch C5. The second forward drive ratio is established by disengaging the fifth clutch C5 and substantially simultaneously engaging the fourth clutch C4. To establish the third forward drive ratio, the fourth clutch C4 is disengaged as the third clutch C3 is engaged. The fourth forward drive ratio is established by disengaging the third clutch C3 while engaging the second clutch C2. To establish the fifth forward drive ratio, the first clutch C1 is disengaged as the third clutch C3 is substantially simultaneously engaged. The sixth forward drive ratio is established by disengaging the third clutch C3 and simultaneously engaging the fourth clutch C4. The reverse drive ratio is established by engaging the third clutch C3 and the fifth clutch C5. The transmission 110 is in neutral when only the fifth clutch C5 is engaged.

Each drive ratio requires the engagement of different combinations of the multiple clutches. Further, shifting between successive forward ratios is accomplished by disengaging one of the clutches, deemed the off-going clutch, and substantially simultaneously engaging the next clutch, deemed the on-coming clutch, while another clutch is engaged during the transition. For example, given the exemplary transmission described above, shifting from the first drive ratio to the second drive ratio is achieved by keeping clutch C1 engaged, disengaging clutch C5 and engaging clutch C4.

Referring back to FIG. 1, the powerplant 102 drives the torque converter 104 via a shaft 112 and the torque converter 104 drives the transmission 110 via a shaft 114. The transmission 110 includes an output shaft 116 that drives the driveline 118. A first speed sensor 115 is responsive to a rotational speed of the input shaft 114 and generates an input shaft speed signal. A second speed sensor 117 is responsive to a rotational speed of the output shaft 116 and generates an output shaft speed signal. A temperature sensor 119 is responsive to a temperature of a transmission fluid and generates a transmission fluid temperature signal.

The speed and torque relationships between the powerplant 102 and the driveline 118 are controlled by the hydraulically operated clutches C1, C2, C3, C4, and C5. Pressurized fluid is provided to the clutches and the torque converter 104 from a regulated hydraulic pressure source 130. The clutches C1, C2, C3, C4, and C5 are coupled to the source 130 via the control valves 132, which regulate clutch pressure by supplying or discharging fluid to/from the clutches C1, C2, C3, C4, and C5.

Operation of the pressure source 130 and the control valves 132 is controlled by the control module 134 in response to various input signals. The input signals include, but are not limited to, the input shaft speed signal ($N_T$), the output shaft speed signal ($N_O$), the transmission fluid temperature signal ($F_t$) and a range selector position signal that is generated by the range selector 128. The control module 134 generates control signals based on the input signals to energize the select control valves 132 to achieve a desired drive ratio. The control signals regulate the hydraulic pressure supplied by the control valves 132. Clutch pressure effects shifting between speed ratios by controllably releasing the pressure in an off-going clutch and controllably applying pressure to the on-coming clutch.

When tie up or flare occurs during a shift, there is an increase in clutch energy ($\Delta E$). $\Delta E$ is defined as the difference between the energy into the clutch ($E_i$) during shift and the energy out of the clutch ($E_o$) during the shift:

$$\Delta E = E_i - E_o$$

The energy $E_i$ going into the clutch can be calculated as the product of clutch torque ($T_c$) and slip speed ($S_c$) across the clutch integrated over the shift time:

$$E_i = \int (T_c \times S_c) dt$$

The shift time is the time that is required to complete the shift.

The clutch torque $T_c$ is calculated based on the clutch pressure ($p_c$), the clutch area ($A_c$), the clutch return spring force ($F_c$), a known friction coefficient (f) for the clutch and constants $k_1$ and $k_2$. $k_1$ and $k_2$ are calibration constants that can be determined from respective look-up tables.

$$T_c = k_1 \times p_c A_c - k_2 \times f \times F_c$$

The clutch slip speed $S_c$ can be determined from the following equation:

$$S_c = g_1 \times N_T - g_2 \times N_O,$$

where $g_1$ and $g_2$ are known factors that are based on the transmission gear design and the shift ratio. The energy $E_o$ going out of the clutch can be calculated as a function of a heat transfer coefficient (h) times the difference in a predicted clutch temperature ($C_t$) and the transmission fluid temperature ($F_t$):

$$E_o = h \times (C_t - F_t)$$

$C_t$ can be determined based on transmission operating parameters from a model or a look-up table.

A clutch energy density (ED) is defined as $\Delta E$ divided by the clutch area $A_c$. The clutch fault detection system determines the status of the clutch, as an indication of clutch fault, which can be imminent (short term) or impending (longer term). The clutch fault detection system selectively activates a default gear shift procedure or issues a diagnostic alert or other warnings depending on the severity of the detected fault.

Figure 3:
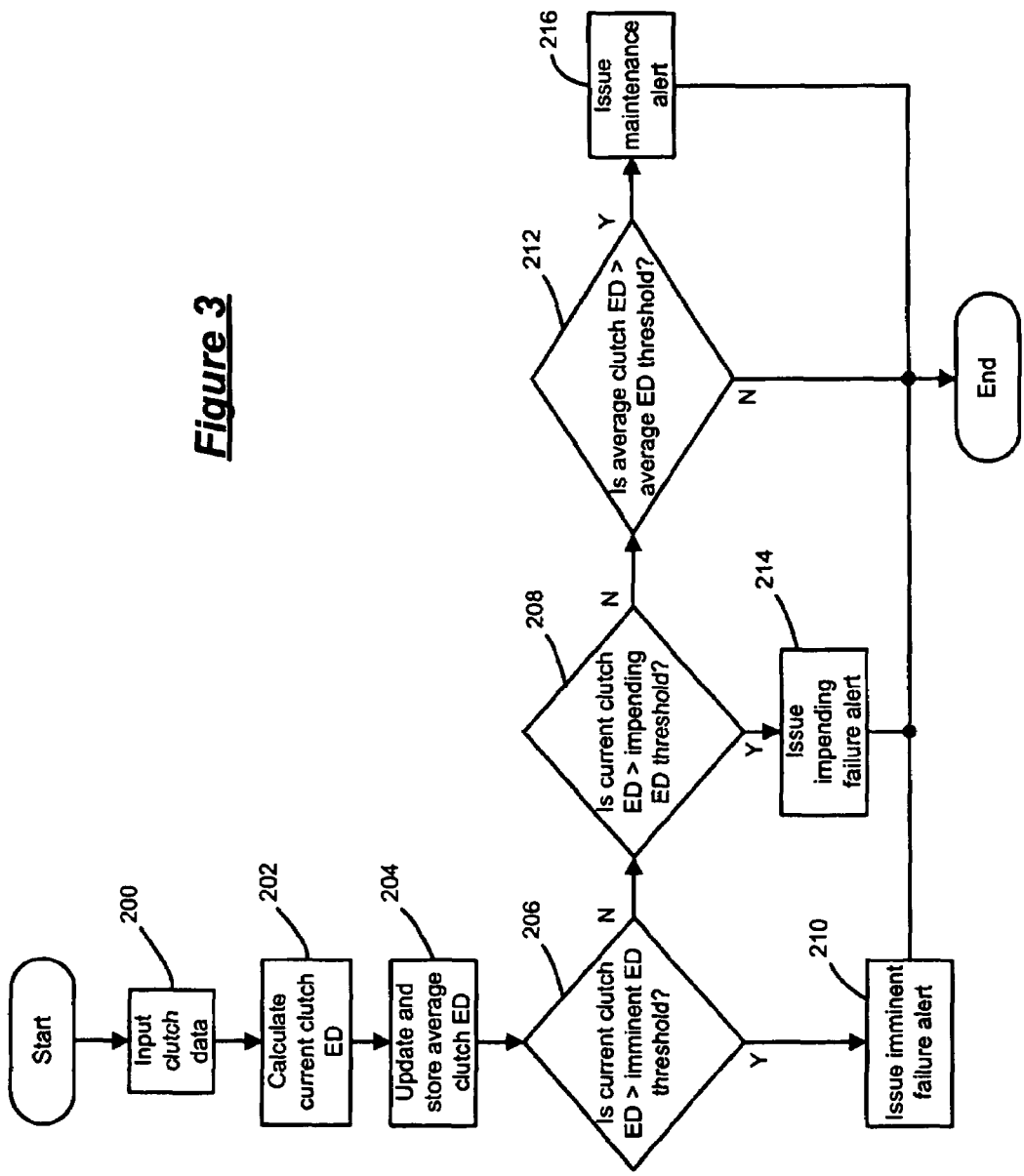
FIG. 3 is an exemplary flowchart illustrating steps performed by the clutch fault detection system of the present invention.

An exemplary flowchart of the steps performed by the clutch fault detection system are illustrated in FIG. 3. In step 200, the clutch data is input and includes all the parameters used to calculate ED during a current clutch shift. The current ED is calculated in step 202. In step 204, the historical or average clutch ED is updated based on the current clutch ED. The average clutch ED is determined over a predetermined number of shifts $N_s$ using clutch ED values that have been stored in memory. For example, if $N_s$ is selected as 10, then the current clutch ED and the previous nine clutch ED values are used to calculate the new average clutch ED. In this example, the current clutch ED is associated with the latest shift (e.g., number 10). The previous clutch ED values associated with number 9-10 drop their orders by one. The previous clutch ED associated number 1 is removed and is not used in future calculations of the average clutch ED.

The current clutch ED is compared to an imminent ED threshold value in step 206 to determine whether a clutch failure is imminent (i.e., shorter term). If the current clutch ED is not greater than the imminent ED threshold, control continues in step 208. If the current clutch ED is greater than the imminent ED threshold, control issues an imminent failure alert in step 210 and ends. The current clutch ED is compared to an impending ED threshold value in step 208 to determine whether a clutch failure is impending (i.e., longer term). The impending ED threshold is less than the imminent ED threshold. If the current clutch ED is not greater than the impending ED threshold, control continues in step 212. If the current clutch ED is greater than the impending ED threshold, control issues an impending failure alert in step 214 and ends.

In step 212, control determines whether the average clutch ED exceeds an average ED threshold. If the average clutch ED is less than the average ED threshold, control ends. If the average clutch ED is greater than the average ED threshold control issues a maintenance alert in step 216. The imminent failure alert, impending failure alert and maintenance alert can each be visual, audible or both.

In a further aspect of the present invention, the clutch energy densities ED for each clutch C1, C2, C3, C4, and C5 over a selected number of range shifts or driving time can be summed to provide a cumulative clutch ED. The cumulative clutch ED can be compared to a cumulative clutch ED threshold to provide warnings for diagnostic purposes. The cumulative clutch ED can be stored in memory and can be used to provide historical data for the performance of the transmission fluid and the automatic transmission 110. It is also anticipated that a default control can be implemented to provide a limp-home mode of vehicle operation along with one or each of the various failure alerts. The default control can limit engine operation (e.g., limit maximum engine speed) and/or limit transmission operation (e.g., limit selectable gear ratios) to avoid potential damage to the transmission.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for detecting a clutch fault of an automatic transmission, the method comprising:
   determining a current clutch energy density of a clutch during a range shift;
   comparing said current clutch energy density to a first energy density threshold; and
   activating a diagnostic alert if said current clutch energy density exceeds said first energy density threshold.

2. The method of claim 1 further comprising:
   comparing said current clutch energy density to a second energy density threshold that is greater than said first energy density threshold; and
   activating default range shifting if said current clutch energy exceeds said second energy density threshold.

3. A method for detecting a clutch fault of an automatic transmission, the method comprising:
   determining a current clutch energy density of a clutch during a range shift;
   comparing said current clutch energy density to a first energy density threshold; and
   activating a diagnostic alert if said current clutch energy density exceeds said first energy density threshold, wherein determining said current clutch energy density comprises:
   determining energy into said clutch;
   determining energy out of said clutch;
   calculating a difference between said energy into and said energy out of the said clutch; and
   dividing said difference by an area of said clutch.

4. The method of claim 3 wherein determining said energy into said clutch comprises:
   determining torque across said clutch; and
   determining slip across said clutch.

5. The method of claim 4 wherein determining said energy out of said clutch comprises determining a difference between a clutch temperature and a transmission fluid temperature.

6. A method of detecting a clutch fault in an automatic transmission, the method comprising:
   determining a current clutch energy density of a clutch during a range shift;
   determining an average clutch energy density over a selected number of recent range shifts of said clutch;
   comparing said average clutch energy density to an average energy density threshold;
   providing a diagnostic warning when said average clutch energy density exceeds said average energy density threshold; and
   storing said current clutch energy density if said average clutch energy density does not exceed said average energy density threshold.

7. A method of detecting a clutch fault in an automatic transmission, the method comprising:
   determining a current clutch energy density of a clutch during a range shift;
   determining an average clutch energy density over a selected number of recent range shifts of said clutch;
   comparing said average clutch energy density to an average energy density threshold;
   providing a diagnostic warning when said average clutch energy density exceeds said average energy density threshold; and
   storing said current clutch energy density if said average clutch energy density does not exceed said average energy density threshold, wherein determining said current clutch energy density comprises:
   determining energy into said clutch;
   determining energy out of said clutch;
   calculating a difference between said energy into and said energy out of said clutch; and
   dividing said difference by an area of said clutch.

8. The method of claim 7 wherein determining said energy into said clutch comprises;
   determining a torque across said clutch; and
   determining a slip across said clutch.

9. The method of claim 8 wherein determining said energy out of said clutch comprises determining a difference between a clutch temperature and a transmission fluid temperature.

10. A method for detecting a clutch fault in an automatic transmission having a plurality of clutches, comprising:
    determining clutch energy densities for each of said plurality of clutches over a selected number of shifts of said automatic transmission;
    determining a cumulative clutch energy density for said plurality of clutches over said selected number of shifts;
    comparing said cumulative clutch energy density to a predetermined cumulative energy density threshold; and
    activating a diagnostic warning if said cumulative clutch energy density exceeds said predetermined cumulative energy density threshold.

11. A method for detecting a clutch fault in an automatic transmission having a plurality of clutches, comprising:
    determining clutch energy densities for each of said plurality of clutches over a selected number of shifts of said automatic transmission;
    determining a cumulative clutch energy density for said plurality of clutches over said selected number of shifts;
    comparing said cumulative clutch energy density to a predetermined cumulative energy density threshold; and
    activating a diagnostic warning if said cumulative clutch energy density exceeds said predetermined cumulative energy density threshold, wherein determining a cumulative energy density comprises summing said energy densities for each clutch and for each shift.

12. The method of claim 11 wherein determining said clutch energy density for each clutch comprises:
    determining an energy into said clutch;
    determining an energy out of said clutch; and
    calculating a difference between said energy into and said energy out of said clutch; and
    dividing said difference by an area of said clutch.

13. A vehicle having an engine and an automatic transmission, comprising:
    a plurality of clutches selectively engageable for range shifting; and
    a control module that calculates a clutch energy density for a particular clutch associated with a range shift that compares said clutch energy density with a stored energy density threshold and activates a diagnostic alert if said clutch energy density exceeds threshold.

14. The vehicle of claim 13 wherein said control module stores said clutch energy density if said clutch energy density threshold is not exceeded.

15. The vehicle of claim 14 wherein said control module determines an average clutch energy density over a predetermined number of range shifts and provide a diagnostic alert if said average clutch energy density exceeds a stored average clutch energy density threshold.

16. The vehicle of claim 13, wherein the clutch energy density is based on a difference between energy into said clutch and energy out of said clutch and an area of said clutch.

17. The vehicle of claim 16, wherein the energy into said clutch is based on torque across said clutch, and a slip across said clutch.

18. The vehicle of claim 16, wherein the energy out of said clutch is based on a difference between a clutch temperature and a transmission fluid temperature.

* * * * *